Nov. 13, 1934.    J. R. CAIN    1,980,381
METHOD OF MAKING DUCTILE ELECTROLYTIC IRON FROM SULPHIDE ORES
Filed May 27, 1931
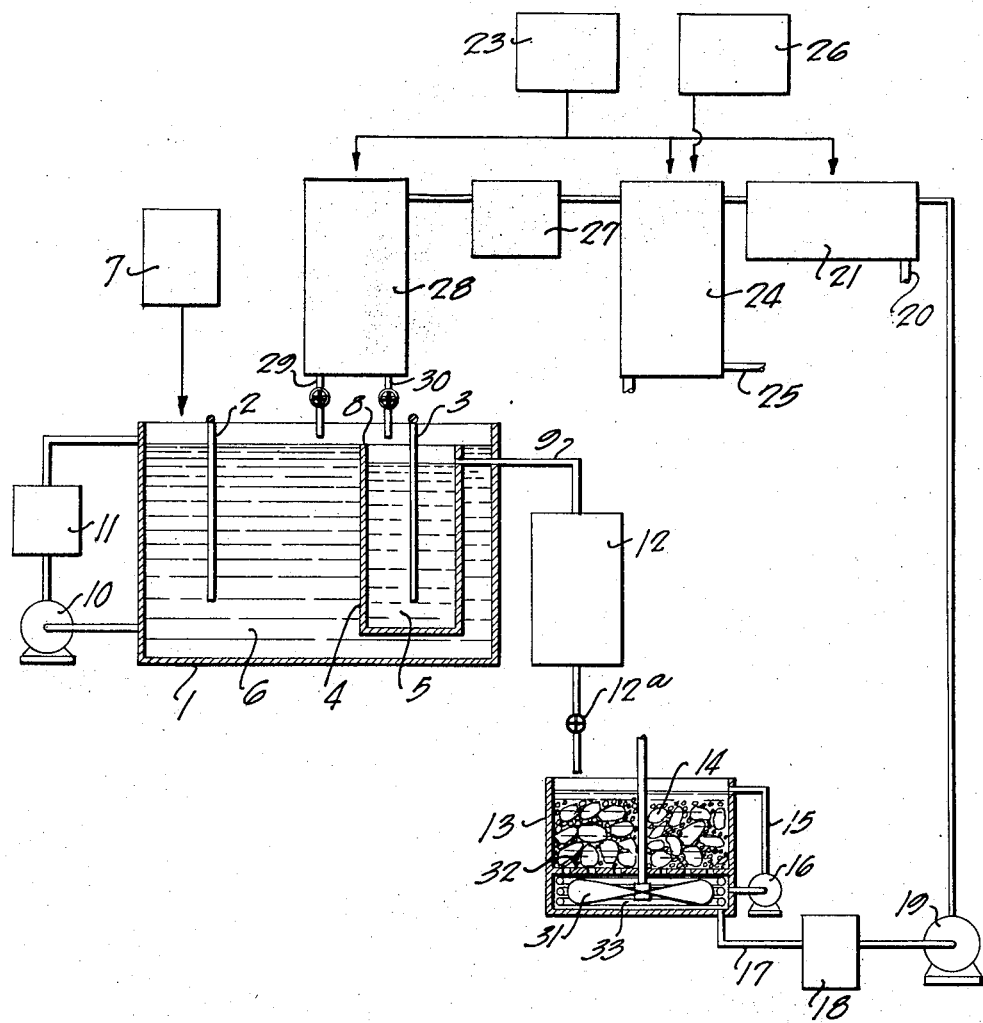
INVENTOR
JOHN R. CAIN
by Roberts Cushman Woodbury
ATTYS Patented Nov. 13, 1934

1,980,381

UNITED STATES PATENT OFFICE 1,980,381

METHOD OF MAKING DUCTILE ELECTROLYTIC IRON FROM SULPHIDE ORES

John R. Cain, Washington, D. C., assignor of one-half to Frederic A. Eustis, Milton, Mass.

Application May 27, 1931, Serial No. 540,345

4 Claims. (Cl. 204—15)

The present invention relates to ductile electrolytic iron and to a method of preparing the same from raw materials containing copper or nickel, etc., in addition to iron.

It has been pointed out in my copending application Serial No. 387,097, filed August 19, 1929, that ductile iron may be prepared directly by the electrolysis of acid solutions of ferrous salts, characterized by having a pH value of 1.0 to 3.0; and it has also been disclosed in my copending application, filed on even date herewith, that various raw materials may be employed for replenishing the iron content of the electrolyte, by separating the anolyte (or electrolyte surrounding the anode) from the catholyte (or electrolyte surrounding the cathode) as by means of a suitably porous wall, and re-cycling the anolyte, preferably after treating the same to effect suitable control of the ferric-ferrous composition thereof.

It is an object of the present invention to provide a method of preparing ductile electrolytic iron, especially from raw materials, such as iron sulphide, which may contain nickel or copper, especially, or other similar metals beside iron. A further object is to recover the copper or nickel and sulphur in useful form. It is also an object to employ oxide ores of iron, which may contain copper or nickel as a part of the raw material and directly to make use of such metallic raw materials, either in lumps or granular form as desired, without the necessity of previous metallurgical treatment. Other objects will appear from the following description.

The process, as carried out in accordance with the present invention, includes generally the electrolysis of an aqueous solution of a ferrous salt, maintaining the electrolyte adjacent to the anode separate from the electrolyte adjacent to the cathode, preferably by means of a freely porous partition or wall, periodically or continuously withdrawing the electrolyte from a point adjacent to the anode, causing the same to react with a source of iron or suitably reduced iron ores which may contain copper, nickel, etc., (or other metal characterized by forming an acid insoluble sulphide) treating the resulting solution with metallic iron and then with hydrogen sulphide, removing the precipitated materials and returning the purified solution to the electrolyte in the anode and/or cathode portion of the cell, together with such addition of acid or alkali as may be required to control the pH value of the electrolyte, between 1.0 and 3.0. The withdrawal and replenishment of the anolyte may be so controlled as to regulate the ratio of ferric to ferrous iron contained therein, preferably to a value of the order of 1:3, more or less.

The raw materials which may be employed comprise, beside steel scrap, pig iron scrap or sponge iron, the various commercial ores of copper and iron such as chalcopyrite ($Cu_2 S$ $FeS$ $FeS_2$) bornite ($Cu_2 S)_3$ $FeS$ $FeS_2$ or concentrates, from flotation or other mechanical concentrating devices, which contain such metals, or pyrites, pyrrhotite or other native iron sulphide ores containing copper or nickel—all of which may be reduced to soluble condition such as ferrous sulphide, as by heating the same with additional quantities of iron, or with suitable oxide ores of iron mixed with reducing agents, as coke, or both, or by other equivalent treatment.

The iron-copper sulphides (and/or free metals) made from such combined use of scrap iron and sulphide ores may be used in my present invention, either as granular or powdered materials, and are readily dissolved by the solution of ferric salts derived from the anolyte or anode portion of the electrolyte, liberating hydrogen sulphide gas or free sulphur, or both. The resulting solution will also contain soluble salts of the other metals present such as copper, nickel, and the like. Therefore, while it is desirable to separate the solution from insoluble residues, it is also desirable to liberate from it the metals other than iron which are dissolved therein. To this end it is recommended that the solution be reduced, as by treating with metallic iron, which will precipitate copper, etc., in metallic form, and then with hydrogen sulphide as hereafter directed which will reduce or eliminate ferric or other oxidized metals which may be present and also precipitate insoluble metal sulphides such as copper sulphide, nickel sulphide, etc.

In order to effect complete segregation and separation of such materials, the solution may advantageously be neutralized, sufficiently to precipitate a small portion of the iron as ferrous hydrate. The latter forms a dispersed, colloidal network throughout the solution which, upon settling therethrough under gravity, sweeps all of the solids before it and carries them to the bottom of the solution whence they may be withdrawn, leaving a clear, uniform and pure supernatant solution of ferrous salts which is admirably suited for electrolysis.

The pH value of the purified solution is now adjusted, as by the addition of acid or alkali as the case may be, and returned to the catholyte or cathode portion of the cell, thereby to control the pH value of the latter within the operating limits above recommended. Continuous operation and uniformity of the deposited metal are thus assured and the precipitated copper sulphide, or other metal, as well as free sulphur and hydrogen sulphide, if desired, are readily recovered as valuable by-products or raw material for other processes.

A typical instance of practice, within the invention will now be described with reference to the accompanying drawing in which the figure illustrates a more or less diagrammatic side elevation of a suitable electrolytic cell and appurtenant apparatus.

Briefly, the apparatus may consist of an electrolytic chamber or tank 1 having a cathode 2 and anode 3 which are suitably connected to an appropriate source of electricity (not shown). The anode 3 is preferably enclosed by a porous diaphragm or cell 4 separating the electrolyte 5 therein (or anolyte) from the rest of the electrolyte 6 which constitutes the catholyte of the system.

In carrying out my invention I prefer to start with anolyte and catholyte of ferrous chloride solution that is 80% or more saturated at room temperature. The pH of the catholyte is then adjusted by the addition of hydrochloric acid from tank 7 until it comes within the range of pH 1.5 to 2.5; a convenient figure is 2.0. The adjustment is effected with the aid of color indicators or by electrometric pH measurements such as are now well known. The catholyte is placed in the electrolytic tank 1 which is provided with means (not shown) for maintaining the temperature at 95 to 100° C.—the preferred working temperature range for this method; the anolyte is placed in the porous cup 4 at the same level as the catholyte. There may be provided a pump 10 with suitable inlet and outlet, for circulating the catholyte, designed to secure regular and uniform circulation; also a filter 11 through which the catholyte may be passed occassionally, the clarified liquid being returned to the electrolytic tank. I have used a sand filter and a rotary pump with success for this work.

Into the electrolyte are set pairs of carbon or graphite or other insoluble anodes 3 suitable for the work in their porous cups 4 and the cathodes 2 of a size appropriate to the size of the tank and the scale of the operation. Nothing in the nature of this invention is apparent that would limit the number of pairs of anodes and cathodes or their size. The spacing can be quite close and such close spacing permits me to realize the practical advantage of a small voltage drop between electrodes.

For cathodes there may be used sheets or plates and these may be of materials; (a) which allow the deposited sheet or bar of ductile iron to be removed by mechanical means, as by using materials for the cathode blanks which hold the deposited iron loosely, or by applying to the face of the cathode blank films of such materials; (b) which permit the cathode blank to be stripped chemically or electrochemically with or without regeneration of the cathode blank; (c) which become integral with the electrodeposited iron, e. g., cathode blanks of ductile electrolytic iron or of pure copper. Furthermore, the cathode blank may be a cylinder or mandrel of any of the above types. There may or may not be mechanical movement of the cathode blank. The advantages of a ductile deposit of iron are very great with nearly all these types of cathodes, as shown by experiments with many of them, and I do not therefore wish to be limited as to cathode type.

The porous cup or diaphragm 4, separating the anode 3 from the cathode 2, must have these qualities: (1) Suitable porosity consistent with necessary mechanical strength; (2) resistance to corrosive or disintegrating action by hot, strong solutions of ferric chloride; (3) freedom from tendency to give off shreds or fibers into the electrolyte surrounding the cathode. The porosity should be such as to interpose a low resistance to the current in passing from anode to cathode, but the pores should not be so large as to permit excessive interdiffusion to take place between the electrolyte within and without the cup. In practice I have found it satisfactory to use a cup made of sand, calcined clay, alundum or similar refractory particles of suitable size and bonded by proper binders. Such vessels are formed and burned at high temperatures, by practices more or less standardized in the ceramic arts and which need not be detailed here. Porous cups or diaphragms of asbestos cloth may be used but must be of such quality that they do not give off shreds or fibers into the outer electrolyte (catholyte) because even when a good filter is used such fibers cause rough deposits and also seem to contribute to brittle deposits. Asbestos cups or diaphragms are therefore less to be desired owing to their gradual deterioration, and diaphragms of linen, cotton, silk, etc., are scarcely of any use.

Having the electrolytic tank and porous cups filled with the electrolyte at 95 to 100° C., the pump and filter connected in, and the anode and cathode pairs connected to a dynamo with voltage and amperage appropriate for the desired rate of making iron and the system of electrical connections for anodes and cathodes, I proceed to operate my bath at a current density (cathode) of 50 to 150 amperes per square foot of cathode or more, the rate of circulation of electrolyte by the pump being adjusted in accordance with the current density shown best by experience. One hundred amperes per square foot has been found a convenient current density (cathodic) in most of my work. Cathodic current density has not been found a fundamental factor in producing ductile iron by my method, inasmuch as a satisfactory degree of ductility can be obtained with a wide variation in current density. After iron has deposited for a while a pH test in the catholyte may show that the pH has changed. If the test shows that the pH is much removed from 2.0, the figure herein set as a desirable mean, enough dilute hydrochloric acid or dilute alkali solution is added (as determined by outside test of a portion of the electrolyte) to bring the main body of the electrolyte back to the pH desired. Such tests and adjustments are made as often as experience shows necessary and once a routine is worked out for a given set of operating conditions, viz., current density, current in relation to volume of electrolyte and rate of circulation, as hereinafter described more fully, the procedure is standardized for any number of repetitions of the same set of conditions.

The anolyte 5 is initially ferrous chloride solution with or without other chlorides such as calcium, magnesium or sodium chlorides and usually of the same strength as the catholyte. Just as soon as electrolysis begins the ferrous chloride of the anolyte begins to be converted to ferric chloride by the chlorine evolved at the anode. If the anode is completely insoluble, as is graphite, all the ferrous chloride in the anolyte may be thus converted when current has passed for a sufficient time. Such changes in the anolyte impose a further condition for securing ductile deposits, namely that the anolyte must be replaced with fresh ferrous chloride solution long before it has been completely converted to ferric chloride. If this is not done a point is reached during continuous electrolysis where the pH of the catholyte changes relatively rapidly to a range unsuitable for giving good, ductile deposits, and also there is likely to be a heavy deposition of sediments which also interfere with maintaining ductile deposits. In order to avoid these difficulties and to continue to get ductile iron deposits it suffices to change the anolyte when approximately one-fourth of its iron has been converted to the ferric condition. This proportion is given merely for convenience and is something that has been found simple to do in practice. More or less ferric iron can be present in the anolyte when it is changed without departing from the invention, and the change may be effected periodically or continuously, as desired.

Without limiting myself to a definite theory to explain or justify this procedure, I believe that what happens is, essentially, that when the proportion of ferric chloride in the anolyte reaches a certain amount the chlorine evolved at the anode is no longer used up practically instantaneously as it had been up to that time, but is then dissolved as such, or possibly as hypochlorous or other oxygen-containing acid in the anolyte. From the anolyte the dissolved chlorine or chlorine-bearing compounds diffuse to a slight extent into the catholyte and immediately disturb the pH relations there and cause the precipitation of sediments of hydrolyzed ferric chloride. As long as this harmful action of chlorine is prevented by changing the electrolyte as suggested and by a suitably regulated porosity of the diaphragm or cup, the slight diffusion of anolyte into catholyte seems to be helpful rather than harmful, since the ferric chloride diffusing to the catholyte is evidently reduced to ferrous chloride by some of the hydrogen that is always being evolved from the cathode during electrolysis; such reduction generates a small amount of hydrochloric acid which seems to be enough to compensate for the small amount of free acid that is neutralized or disappears during an electrolysis. Whatever the explanation, the observed fact is that when using a diaphragm of suitable porosity as herein directed little or no hydrochloric acid needs to be added to the catholyte over periods of several hours continuous electrodeposition of iron when using an insoluble anode. In fact, occasionally there is an increase in free acid that has to be neutralized by a small addition of alkali solution.

In carrying out my process continuously it is necessary to renew the anolyte as directed and also to maintain the iron content of the catholyte since iron is being constantly removed therefrom by electrolysis. Both objects may be accomplished by allowing the catholyte to flow, regularly or periodically, over the top edge 8 of the anode compartment 4 into the anolyte 5, and by similarly removing the anolyte through overflow 9 into a storage tank 12, from which it may be drawn by gravity, as required, through valve 12ª to one or more of a series of leaching tanks, of which one is indicated at 13. The leaching tanks may contain granular or powdered iron-copper sulphides, from which the iron and sulphur contents are dissolved and the ferric chloride of the anolyte is changed to ferrous chloride proportionately to the amount of sulphides dissolved. In practice an excess of the sulphide material is used so that after a certain time, varying from 3 to 8 hours, according to the materials used and other conditions, substantially all of the ferric chloride has been changed to ferrous chloride.

The digestion of the sulphide materials 14 is preferably facilitated by circulating the liquor, as for example through by-pass 15 by means of a pump 16 and by mechanical stirrers 31. The solids are also conveniently supported upon a perforated false bottom 32 and means such as steam pipes 33 are provided for keeping the solvent at 90° C. or above.

The solution is then drawn off at 17 and passed through filter 18 by means of pump 19 and delivered to a storage tank 21 where it is subjected to treatment to remove copper and metals of the hydrogen sulphide group. The insoluble material is collected on the filter and treated to recover sulphur and any other materials of value which it may contain, by steps which need not be described.

The solution as produced by reaction of the discharged anolyte on the excess of sulphide raw material and at a temperature of 80 to 90° C. (or heated to this temperature if necessary) may now be acidified by the addition of a 1% or 2% solution of hydrochloric acid, from tank 23, if necessary. It is then treated with scrap iron to precipitate the copper or other metals which may be contained therein. This treatment may be done in conventional ways practiced in the industry of making cementation copper, as by use of precipitating machines with stirrers, counter-current precipitators and the like (not shown). The solids may be removed at 20 and precipitated copper separated from the liquor and from the excess of iron, by conventional methods which need not be described. The copper, which may be from 80 to 95% pure is marketed as cement copper, if desired, with or without pre-treatment to recover any platinum, gold or silver it may contain.

If it is desired to make only ordinary (i. e., non-ductile) electrolytic iron the ferrous chloride solution after removal of copper by iron may be returned directly to the cathode portion of the electrolytic cell 1. Ordinarily, rough, non-ductile deposits of iron will then be made, however, because I have found that in the presence of small amounts of copper or other metals belonging to the hydrogen sulphide group, not precipitated by iron, electro-deposition of iron generally results in such rough deposits if the usual procedure for making ductile iron is followed.

Therefore, in order to secure smooth, ductile deposits of iron I further treat the ferrous chloride solution so as to remove such metals. To accomplish this, the pH of the solution is adjusted to a value between 1.0 and 3.0 by means of hydrochloric acid from tank 23 (or dilute alkali solution at 26) and passed into a second chamber 24 where it is heated, preferably to boiling by any suitable means (not shown) and an excess of hydrogen sulphide passed therethrough preferably introduced at the bottom while it is cooling, as indicated at 25. Ordinarily the precipitate that forms settles and the solution can be filtered readily to give a clear filtrate. Sometimes, however, the filtrate is turbid, possibly from colloidal matter or fine material difficult to remove by a filter. In such cases, steps must be taken to remove such finely divided suspended or colloidal matter, otherwise the deposits of iron may be unsatisfactory.

A simple expedient for accomplishing this is to form a small precipitate of ferrous hydroxide in the solution which drags down or adsorbs the colloidal or fine solid matter. Without limiting myself to this particular way of removing such suspended or colloidal matter I find that good results are secured by adding slowly, with vigorous stirring, to the hot boiling solution a suitable quantity of sodium hydroxide solution or ammonium hydroxide or similar alkali. Most of the hydrogen sulphide dissolved in the solution is thus precipitated as ferrous sulphide along with some ferrous hydroxide. These precipitated materials settle rapidly and drag down the colloidal or difficultly filterable material, and after filtration a clear solution results. This solution is adjusted to a pH value of 1.0 to 2.5 by the addition of hydrochloric acid from tank 23, for example, and any traces of hydrogen sulphide removed by blowing air or steam through the solution. Sometimes it is advantageous to blow out with air or steam before forming the ferrous hydroxide precipitate.

The thus treated solution of ferrous chloride may be filtered as at 27 and stored in tank 28 from which it may be returned either to the cathode or anode compartment of the electrolytic tank 1, through pipes 29 and 30, respectively, or to both, in such quantities as may be required, and the cycle may be operated continuously.

The precipitate by hydrogen sulphide is treated by appropriate methods for recovery of gold, silver, copper, lead or other metals worth recovering. Since the amount of this precipitate in a single operation is small, ordinarily recovery operation will be conducted on the combined precipitates from several operations. The ferrous sulphide precipitates (which may carry nickel) can also be combined for subsequent recovery operations.

I may convert the copper, after some purification, either to copper sulphate solution to be employed as electrolyte for depositing copper in conventional methods, or partly convert the copper to such electrolyte and partly to soluble anodes of copper to be employed in such electrolyte. The purpose of such steps for utilizing the copper may be, for instance, to allow it to be plated in a thick, adherent layer on a thicker body of the electrolytic iron produced from said raw materials by the methods herein described.
The plating may be conducted so as to generate a composite iron-copper body, having an inner, thick core of ductile electrolytic iron, coated with an outer, integral sheath of pure electrolytic copper. Such composite body can, if desired, then be drawn to wire or cable, providing a material of high conductivity, on account of the purity of both the iron and the copper, and also of great strength, because of the properties of the iron core. The ductility, as deposited, of the iron and copper constituting this body are highly advantageous in the drawing operations. Methods similar to this for making use of the valuable quality of ductility in the electrodeposited metal for subsequent working operations are described in my pending application, Serial No. 237,295. It will be understood, of course, that such working or drawing of the metal requires occasional annealing and this is contemplated in my invention.

It should be understood that the present disclosure is for the purpose of illustration only and that this invention includes all modifications and equivalents which fall within the scope of the appended claims.

I claim:

1. Method of making ductile electrolytic iron, comprising as steps subjecting a solution of a ferrous salt to electrolysis between a pair of electrodes, while maintaining the solution surrounding the anode separated from the solution surrounding the cathode by a porous wall, withdrawing the anolyte, contacting the same with a reduced source of iron containing one or more of the hydrogen sulphide group of metals, treating the reduced solution with metallic iron, separating the residual solution from precipitated solids, regulating the hydrogen ion concentration thereof to pH valve between 1.0 and 3.0, treating with hydrogen sulphide, separating insoluble matter therefrom precipitating small quantities of iron hydroxide in the solution to remove any colloidal suspended solid matter, correcting the solution to a pH value substantially between 1.5 and 2.5 and returning the solution to the solution surrounding the cathode and controlling the latter to a pH value between 1.0 and 3.0.

2. Method of making ductile electrolytic iron, comprising as steps subjecting a solution of a ferrous salt to electrolysis between a pair of electrodes, while maintaining the solution surrounding the anode separated from the solution surrounding the cathode by a porous wall, withdrawing the anolyte, contacting the same with a reduced source of iron containing one or more of the hydrogen sulphide group of metals, treating the reduced solution with metallic iron, separating the residual solution from precipitated solids, regulating the hydrogen ion concentration thereof to pH valve between 1.0 and 3.0, treating with hydrogen sulphide, adding sufficient alkali to precipitate a small proportion of ferrous hydroxide, separating insoluble matter from the solution correcting the solution to a pH value substantially between 1.5 and 2.5 and returning the solution to the electrolytic cicyle.

3. Method of making ductile electrolytic iron, comprising as steps subjecting a solution of a ferrous salt to electrolysis between a pair of electrodes, while maintaining the solution surrounding the anode separated from the solution surrounding the cathode by a porous wall, withdrawing the anolyte, contacting the same with a reduced source of iron containing one or more of the hydrogen sulphide group of metals, treating the reduced solution with metallic iron, separating the residual solution from precipitated solids, regulating the hydrogen ion concentration thereof to pH value between 1.0 and 3.0, treating with hydrogen sulphide, separating insoluble matter therefrom, blowing the solution with an inert gas to expel dissolved hydrogen sulphide precipitating small quantities of iron hydroxide in the solution to remove any colloidal suspended solid matter, correcting the solution to a pH value substantially between 1.5 and 2.5 and returning the solution to the solution surrounding the cathode and controlling the latter to a pH value between 1.0 and 3.0.

4. Method of making ductile electrolytic iron, comprising as steps subjecting a solution of a ferrous salt to electrolysis between a pair of electrodes, while maintaining the solution surrounding the anode separated from the solution surrounding the cathode by a porous wall, withdrawing the anolyte, contacting the same with a reduced source of iron containing one or more of the hydrogen sulphide group of metals, treating the reduced solution with metallic iron acidifying and then treating with hydrogen sulphide, separating insoluble matter therefrom, and returning the solution to the electrolytic chamber, and controlling the ferric-ferrous iron ratio of the anolyte to a value of substantially 1:3, and the pH value between 1.0 and 3.0.

JOHN R. CAIN.